United States Patent [19]

Rutschmann

[11] Patent Number: 5,582,004

[45] Date of Patent: Dec. 10, 1996

[54] EXHAUST SYSTEM FOR A MULTI-CYLINDER INTERNAL COMBUSTION ENGINE

[75] Inventor: Erwin Rutschmann, Tiefenbronn, Germany

[73] Assignee: Dr. Ing. h.c.F. Porsche AG, Weissach, Germany

[21] Appl. No.: 522,960

[22] Filed: Sep. 1, 1995

[30] Foreign Application Priority Data

Sep. 1, 1994 [DE] Germany .......................... 44 31 058.7

[51] Int. Cl.⁶ ............................................... F01N 3/28
[52] U.S. Cl. .................................... 60/288; 60/302
[58] Field of Search ........................................ 60/288, 302

[56] References Cited

U.S. PATENT DOCUMENTS

| 3,943,710 | 3/1976 | Lange | 60/288 |
| 3,984,975 | 10/1976 | Price | 60/284 |
| 4,107,921 | 8/1978 | Iizuka | 60/288 |
| 4,287,716 | 9/1981 | Schuster | 60/288 |
| 5,325,666 | 7/1994 | Rutschmann | 60/288 |

FOREIGN PATENT DOCUMENTS

| 2912796 | 10/1980 | Germany . |
| 3740238 | 6/1988 | Germany . |
| 4332086 | 3/1994 | Germany . |

*Primary Examiner*—Douglas Hart
*Attorney, Agent, or Firm*—Evenson, McKeown, Edwards & Lenahan, P.L.L.C.

[57] ABSTRACT

A multi-cylinder internal combustion engine is provided with a group of constantly operated cylinders and a group of cylinders that can be switched off. An exhaust line having a catalytic converter is associated with each group of cylinders. A shutoff element is disposed downstream of the catalytic converter of the constantly operated cylinder subassembly. In addition, the two exhaust lines or the two catalytic converters are connected to each other via a bypass line. Maintaining the temperature of the second catalytic converter is made possible via the bypass line, even when the cylinders of the second group are not operated and when the exhaust line is closed.

12 Claims, 1 Drawing Sheet

EXHAUST SYSTEM FOR A MULTI-CYLINDER INTERNAL COMBUSTION ENGINE

BACKGROUND AND SUMMARY OF THE INVENTION

The invention is based on an exhaust system for a multi-cylinder internal combustion engine and, more particularly, to an exhaust system for a multi-cylinder internal combustion engine with a first group of cylinders that cannot be switched off and a second group of cylinders that can be switched off, with exhaust lines associated with each group which start from exhaust manifolds, with at least two catalytic converters in the exhaust system, and with an actuating member in one of the exhaust lines.

German Patent document DE 29 12 796 C2 discloses an exhaust system of the above-mentioned type for a multi-cylinder engine in which one group of cylinders is operated constantly and another group of cylinders can be switched off. Two catalytic converters are disposed in the exhaust system, through which in succession there is a flow of exhaust gas from the constantly operated cylinders. Via an actuating element, the exhaust flow from the cylinder group that can be switched off can be alternatively conducted via both catalytic converters, which are connected in series, or via only one of the two catalytic converters. An exhaust system of this kind is relatively expensive since it requires a multi-position actuating element and a multitude of line connections. Furthermore, both catalytic converters, which are connected in series, experience a continuous flow through them of the exhaust gas from the cylinder group that is not switched off. This can lead to a rapid aging. Furthermore, a series connection of both catalytic converters leads to different operating temperatures and heating behaviors. The temperature of the first catalytic converter is very high, while that of the second is relatively low. This also results in slower heating of the second catalytic converter.

German Patent document DE 37 40 238 A1 discloses an exhaust system for an internal combustion engine with two banks of cylinders, in which each of the two exhaust pipes is split into two partial flows and in which a partial flow from the one bank of cylinders is combined with a partial flow from the other, before reaching each catalytic converter. In this way, a largely identical combination of the exhaust gases flowing through the catalytic converters is claimed to be achieved. No provision is made for switching off cylinders.

Furthermore, German Patent document DE 43 32 086 A1 discloses an exhaust system for a two-row internal combustion engine in which an alternative shortening or lengthening of the exhaust pipe upstream of the catalytic converter, depending upon the exhaust temperature, is possible via a shutoff element in each of the two exhaust pipes and lateral connections disposed upstream of the two exhaust pipes.

There is therefore needed an exhaust system for an internal combustion engine, having a group of cylinders that can be switched off, which is simply designed and in which the catalytic converter associated with the cylinder group that can be switched off experiences a flow through it to the extent that it does not cool too severely after the cylinder group is switched off. This is so that it is possible for the catalytic converter to rapidly become effective after the cylinder group is again switched on.

These needs are met according to the present invention by an exhaust system for a multi-cylinder internal combustion engine with a first group of cylinders that cannot be switched off and a second group of cylinders that can be switched off, with exhaust lines associated with each group which start from exhaust manifolds, with at least two catalytic converters in the exhaust system, and with an actuating member in one of the exhaust lines. A first catalytic converter is disposed in the exhaust line associated with the first group of cylinders and a second catalytic converter is disposed in the exhaust line associated with the second group of cylinders. A bypass line is disposed between the first and the second exhaust lines. The actuating member is disposed downstream of the first catalytic converter. The actuating member is a shutoff element which unblocks an opening when the second group of cylinders is switched on and at least partially closes the opening when the second group of cylinders is switched off.

If a catalytic converter is disposed in each of the exhaust lines of the constantly operated cylinder subassembly and the cylinder subassembly that can be switched off, a bypass line runs between these two catalytic converters. The exhaust pipe of the catalytic converter, which is associated with the constantly operated cylinder group, can then be totally or partially shut off or throttled downstream of the catalytic converter. As a result, cooling of the catalytic converter of the cylinder group that can be switched off must be largely prevented after they are switched off. The exhaust system is simply designed since it does not require a large number of pipeline connections or branchings and the actuating element connected downstream can be provided as a simple shutoff element or throttle valve.

Cooling of the catalytic converter associated with the cylinder group that can be switched off can be prevented particularly well and simply if the bypass line begins at the exhaust line of the constantly operated cylinder subassembly, upstream of the catalytic converter associated with this cylinder subassembly. The bypass line feeds into the exhaust line of the cylinder subassembly that can be switched off, upstream of the corresponding catalytic converter. When the shutoff element is completely closed, therefore, the very hot exhaust flow, which has branched off upstream of this catalytic converter, can heat the catalytic converter disposed in the shut off exhaust pipe due to pulsations. When the shutoff element (throttle valve) is partially closed, splitting of the exhaust flow from the constantly operated cylinder subassembly can be achieved, so that both catalytic converters are acted upon by a partial exhaust flow. This largely prevents cooling of the catalytic converter of the cylinder subassembly that is switched off.

Good heating and rapid restarting of the catalytic converter of the cylinder group that is switched off is achieved with a short pipeline length if, in the exhaust flow direction, the bypass line is connected to the exhaust line of the constantly operated cylinder subassembly downstream of the catalytic converter and upstream of the shutoff element. The bypass line feeds into the exhaust line of the cylinder subassembly that can be switched off, upstream of the corresponding catalytic converter. The bypass line can be connected directly to the outlet side of the catalytic converter so that long line paths are prevented and the hot partial flow of exhaust gas is supplied directly to the second catalytic converter.

Inserting a third catalytic converter in this bypass line prevents an unpurified partial exhaust flow from escaping via the bypass line, the outlet side of the first catalytic converter, directly into its outlet side exhaust line when both cylinder groups are operating and therefore the shutoff element is open.

An exhaust system of this type is particularly suited for engines with two rows of cylinders, of which one row of cylinders is constantly operated and the other row of cylinders can be switched off, since in this way, the expense of providing lines can be kept particularly low, and the combining of the exhaust volumes of the individual cylinders is possible in a particularly simple way.

Other objects, advantages and novel features of the present invention will become apparent from the following detailed description of the invention when considered in conjunction with the accompanying drawings.

DETAILED DESCRIPTION OF THE DRAWINGS

Figure 1:
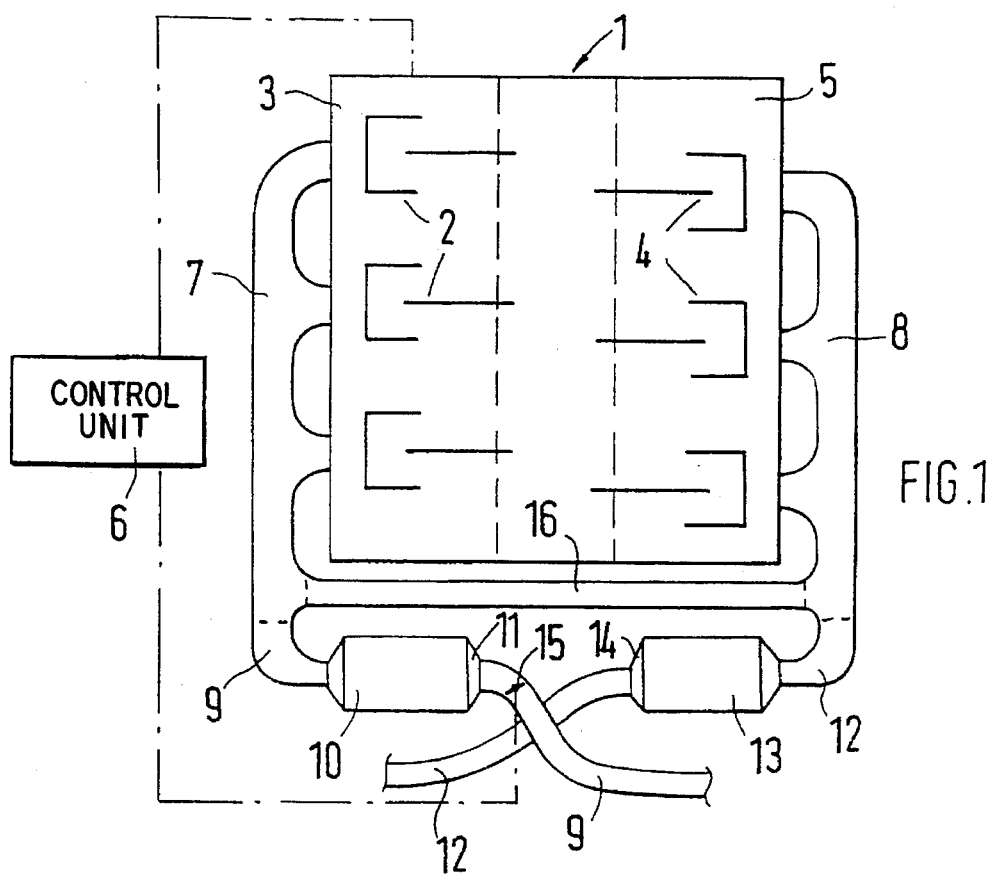
FIG. 1 is a schematic diagram representing an internal combustion engine with a first exemplary embodiment of the exhaust system.

FIG. 1 schematically represents an internal combustion engine 1 with two groups of cylinders, in which the cylinders 2 of the first group 3 are constantly operated. The cylinders 4 of the second group 5, which are indicated by schematically represented pistons, can be switched off depending upon certain criteria. The switching off or switching on of the cylinders 4 of the second group 5 is triggered by a control unit 6. The engine 1 in this exemplary embodiment is shown as an opposed cylinder engine having six cylinders, in which the cylinders 4 that can be switched off are disposed in one row, while the constantly operated cylinders 2 are associated with the opposite row of cylinders. However, the invention, which is further described below, can also be readily transferred to other two-row or one-row engines having a plurality cylinders.

The outlets, not shown, of the cylinders 2 and 4 are connected to an exhaust system via exhaust manifolds 7, 8. The one exhaust manifold 7 of the first group 3 of cylinders 2 leads to an exhaust line 9 in which is located a first catalytic converter 10. From the outlet 11 of the first catalytic converter 10, the exhaust line 9 leads further to mufflers, which are not shown since they are not essential to the invention. The other exhaust manifold 8 feeds into a second exhaust line 12, in which a second catalytic converter 13 is disposed. A shutoff element 15 in the form of a swiveling valve is disposed in the exhaust line 9 of the constantly operated cylinder subassembly, downstream of the outlet 11 of the first catalytic converter 10 in the exhaust flow direction. The actuating unit, not shown, for this shutoff element is triggered by the control unit 6.

A bypass line 16 runs between the two exhaust lines 9 and 12, upstream of the catalytic converters 10 and 13 in the exhaust flow direction, via which bypass line 16 the two exhaust pipes are connected to each other.

If all the cylinders 2, 4 are operated in the operation of the engine 1, the shutoff element 15 is switched into its open position via the control unit 6. The exhaust flow from the cylinders 2 of the first group 3 of cylinders is conducted via the exhaust manifold 7, the exhaust line 9, and the first catalytic converter 10, past the open shutoff element 15 to the downstream part of the exhaust system. The exhaust flow from the cylinders 4 of the second group 5 of cylinders, which are switched on, is carried onward via the exhaust manifold 8, the exhaust line 12, and the second catalytic converter 13. Due to the pulsations of the exhaust flow, a small partial exhaust flow from the first group 3 of cylinders 2 can continue on via the bypass line 16 and via the exhaust line 12 and the second catalytic converter 13. In precisely this manner, a small partial flow of the exhaust from the cylinders 4 of the second group 5 can be conveyed via the first catalytic converter 10.

If the second group 5 of cylinders 4 is shut off by the control unit 6, at the same time or with a slight time delay, the shutoff element 15 is then adjusted either into its closed position or into an only partially closed throttle position. This is done so that the exhaust line 9 is closed or throttled, downstream of the first catalytic converter 10 in the flow direction. The exhaust of the first group 3 of cylinders 2—as previously described—is carried onward via the exhaust manifold 7 and the exhaust line 9. When the shutoff element 15 is completely closed, this exhaust flow is carried via the bypass line 16 into the exhaust line 12 and flows through the second catalytic converter 13. A small partial flow of this exhaust can pulsatingly flow through the first catalytic converter 10 up to the shutoff element 15, because of pulsations in the exhaust manifold 7 and the exhaust line 9. This hot partial exhaust flow from the first group 3 of cylinders 2 is in a position to protect this catalytic converter 10 from an excessive cooling. Therefore after the second group 5 of cylinders 4 is switched back on, an immediate or rapid starting of the catalytic converter 10 is possible since this maintains its operating temperature, or only drops slightly from the operating temperature. If the shutoff element 15 is only partially closed, i.e. is swiveled in a throttle position, a splitting of the exhaust flow from the constantly operated cylinder subassembly to both exhaust lines 9, 12 is produced due to the throttle effect downstream of the first catalytic converter 10. The splitting of both partial flows depends upon the position of the shutoff element 15 (throttle valve). This throttle position of the shutoff element should be chosen by corresponding triggering so that an even splitting of the exhaust flow from the first group 3 of cylinders 2 to both exhaust lines 9, 12 or to both catalytic converters 10, 13 is produced.

Figure 2:
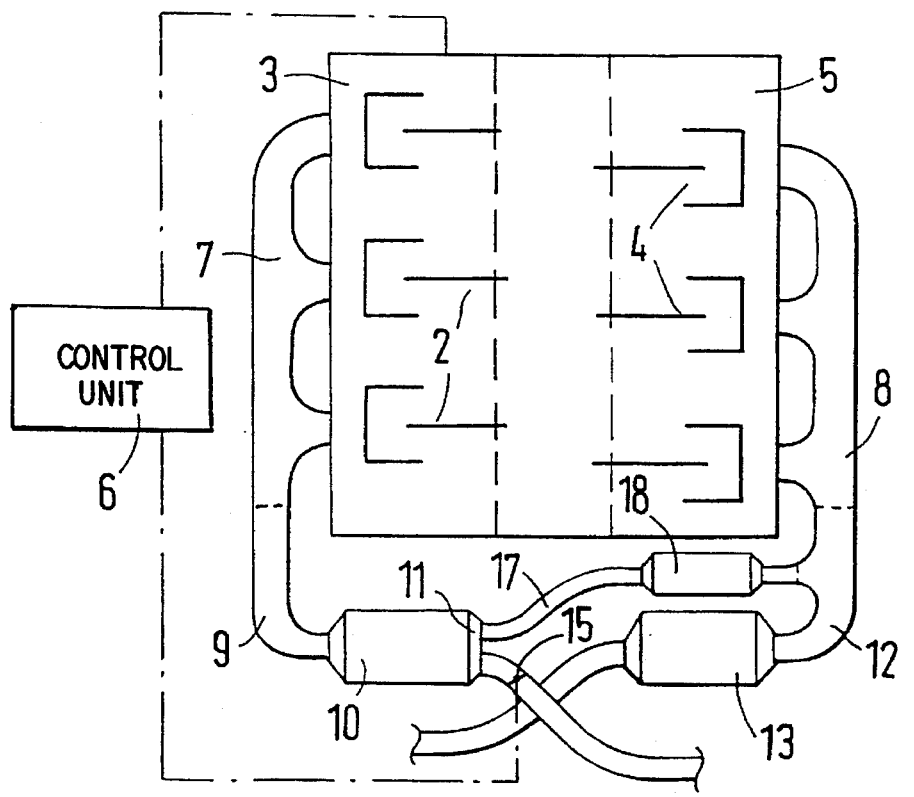
FIG. 2 is a schematic diagram representing a second exemplary embodiment of the exhaust system.

The exemplary embodiment according to FIG. 2 distinguishes itself from the one described above with respect to FIG. 1 only by the construction and routing of the bypass line. The bypass line 17 of the second exemplary embodiment feeds into the exhaust line 12 between the second catalytic converter 13 and the exhaust manifold 8. The opposite end of the bypass line 17 is connected to the outlet 11 of the first catalytic converter 10. Furthermore, an additional, small volume third catalytic converter 13 is disposed in the bypass line 17.

If the engine 1 of the second exemplary embodiment is operated with both groups 3, 5 of cylinders 2, 4 switched-on, then the exhaust of the first group 3 of cylinders 2 is conveyed via the exhaust manifold 7, the exhaust line 9, and the first catalytic converter 10, past the shutoff element 15, which is opened by the control unit 6, to the downstream part of the exhaust system. The exhaust of the second group 5 of cylinders 4 is carried via the exhaust manifold 8, the exhaust line 12, and the second catalytic converter 13. Small partial exhaust flows of the first group 3 of cylinders 2—as in the above exemplary embodiment—can be conveyed via the bypass line 17 to the second catalytic converter 13 and, vice versa, small partial flows of the exhaust of the second group 5 of cylinders 4 can be conveyed to the first catalytic converter 10 in the exhaust line 9.

If the second group 5 of cylinders 4 is shut off by the control unit 6, the shutoff element 15 is also transferred into its closed position. The exhaust of the first group 3 of cylinders 2—as previously described—is carried via the exhaust line 9 and the first catalytic converter 10. Due to the closed shutoff element, this hot exhaust gas, after flowing through the catalytic converter 10, is conveyed via the bypass line 17 to the second catalytic converter 13. Consequently, the second catalytic converter 13 is acted upon by the outlet side 11 of the first catalytic converter 10 with the hot exhaust flow from the first group of cylinders so that cooling is largely prevented.

The catalytic converter 18 in the bypass line 17 prevents an unpurified partial exhaust flow from the first group of cylinders from reaching, via the bypass line 17 and the outlet of the second catalytic converter 13, into the part of the exhaust line 12 downstream of the second catalytic converter 13 when the shutoff element 15 is open.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An exhaust system for a multi-cylinder internal combustion engine having a first group of cylinders which cannot be switched off, and a second group of cylinders which can be switched off, comprising:

a first exhaust line associated with the first group of cylinders;

a first catalytic converter disposed in said first exhaust line;

a second exhaust line associated with the second group of cylinders;

a second catalytic converter disposed in said second exhaust line;

a bypass line disposed between said first, exhaust line and said second exhaust line; and an actuating member disposed downstream of said first catalytic converter, said actuating member being a shutoff element which unblocks an opening when said second group of cylinders is switched on and at least partially closes the opening when the second group of cylinders is switched off.

2. The exhaust system according to claim 1, wherein said bypass line is connected to the first exhaust line upstream of said first catalytic converter in a flow direction of the exhaust gas of said first group of cylinders.

3. The exhaust system according to claim 1, wherein the bypass line is connected to the second exhaust line upstream of said second catalytic converter in a flow direction of the exhaust gas of said second group of cylinders.

4. The exhaust system according to claim 2, wherein the bypass line is connected to the second exhaust line upstream of said second catalytic converter in a flow direction of the exhaust gas of said second group of cylinders.

5. The exhaust system according to claim 1, wherein said shutoff element is completely closed when said second group of cylinders is switched off.

6. The exhaust system according to one of claim 1, wherein said shutoff element is switched into a partially closed throttle position when said second group of cylinders is switched off.

7. The exhaust system according to claim 1, wherein said bypass line is connected to the first exhaust line between said first catalytic converter and said shutoff element.

8. The exhaust system according to claim 7, wherein the bypass line is connected directly to an outlet side of said first catalytic converter.

9. The exhaust system according to claim 1, further comprising a third catalytic converter disposed in said bypass line.

10. The exhaust system according to claim 7, further comprising a third catalytic converter disposed in said bypass line.

11. The exhaust system according to claim 8, further comprising a third catalytic converter disposed in said bypass line.

12. The exhaust system according to claim 1, wherein said engine includes two rows of cylinders, one of said two rows being formed by said first group of cylinders and the other of said two rows being formed by said second group of cylinders.

* * * * *